Figure 1:
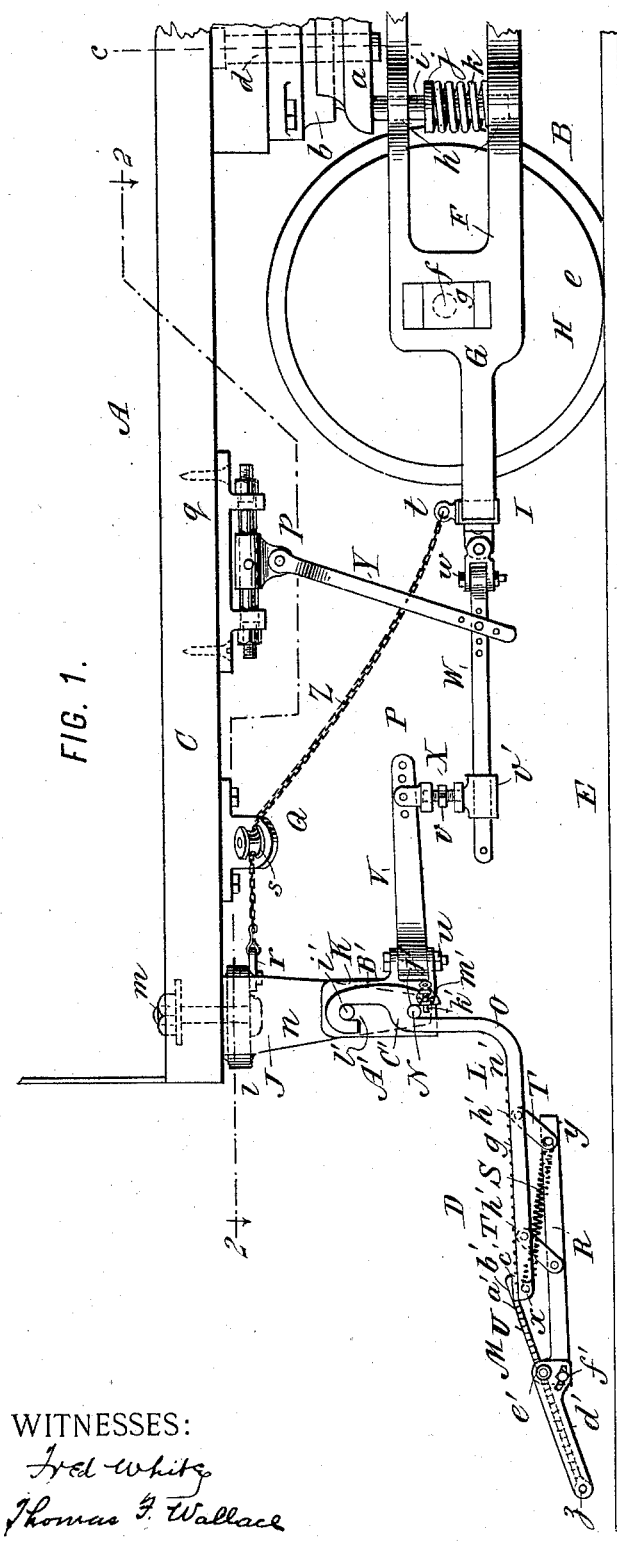

(No Model.) 2 Sheets—Sheet 1.

J. N. WEIKLY.
CAR FENDER.

No. 585,729. Patented July 6, 1897.

WITNESSES:
Fred White
Thomas F. Wallace

INVENTOR:
James N. Weikly,
By his Attorneys,
Arthur C. Fraser & Co.

(No Model.) 2 Sheets—Sheet 2.
J. N. WEIKLY.
CAR FENDER.
No. 585,729. Patented July 6, 1897.
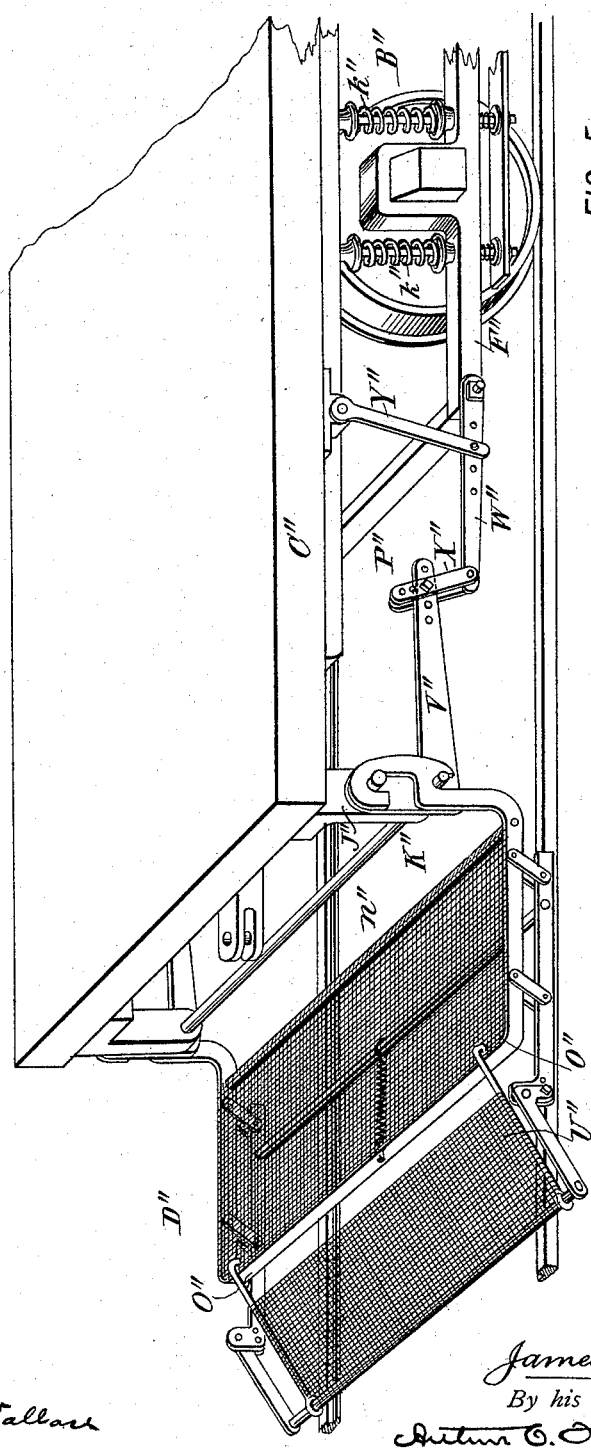
WITNESSES:
Fred White
Thomas F. Wallace
INVENTOR:
James N. Weikly
By his Attorneys,

UNITED STATES PATENT OFFICE.

JAMES N. WEIKLY, OF JERSEY CITY, NEW JERSEY, ASSIGNOR TO GEORGE HOLT FRASER, OF BROOKLYN, NEW YORK.

CAR-FENDER.

SPECIFICATION forming part of Letters Patent No. 585,729, dated July 6, 1897.

Application filed March 23, 1895. Renewed November 30, 1896. Serial No. 614,022. (No model.)

*To all whom it may concern:*

Be it known that I, JAMES N. WEIKLY, a citizen of the United States, residing in Jersey City, Hudson county, New Jersey, have invented certain new and useful Improvements in Fenders or Guards for Cars and the Like, of which the following is a specification.

This invention relates to fenders or guards for cars or other vehicles and aims to provide certain improvements in devices of this character.

In car construction particularly it is usual to mount the car body or frame elastically over the trucks in order that the jars incident to running may be cushioned or dissipated between the truck and body. Springs are usually employed as the cushioning agent and are adapted to permit considerable relative movement, usually referred to as "teetering," between the body and truck, this movement in some instances amounting at the ends of the body to a rise or fall of as much as eight inches beyond the mean or normal level of such end. This abnormal displacement of the body is sometimes aggravated by an unequal distribution of the load carried by the car, especially in cars mounted upon double trucks, wherein the displacement of the body is mainly due to an unequal distribution of the load and very slightly affected by teetering.

Heretofore much difficulty has been encountered in employing car-fenders because of the continual and varied displacement of the body relatively to the trucks, and consequently relatively to the track or road pavement over which the car runs, and difficulty has been experienced in providing a fender for multiple-truck cars which should cover the track while the car traverses a curve.

My invention aims to provide an improved car-fender which shall compensate for the displacement of the body relatively to the track, which can be effectively used on curves, which can be maintained close to the track, and will avoid the risk of passing over instead of under any person or obstacle in the path of the car.

To this end in carrying out the preferred form of the invention I provide a fender which while disposed above and out of contact with the track and carried by some suitable part of the car or its running-gear still maintains a substantially uniform position relatively to the track throughout the vertical movements of the car, and I provide means for shifting the fender relatively to the car, preferably operated by the vertical swinging of the car-body, and when so operated changing the position of the fender to keep it in juxtaposition to the track, and I provide for double-truck cars means for tilting the fender as the trucks swing relatively to the body on the curve to bring the fender inwardly over the curved track, and I provide means for partly or entirely closing the space between the fender and track as an obstacle is encountered to insure that the fender shall pass beneath it, and I provide certain other features of improvement which will be fully hereinafter set forth.

Figure 2:
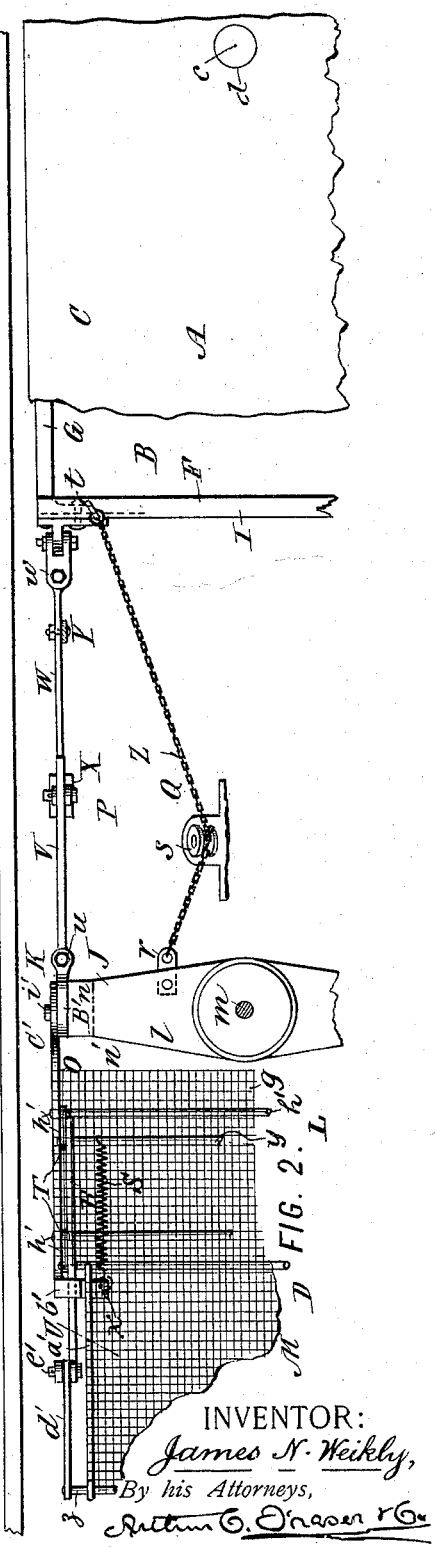

In the accompanying drawings, which illustrate certain adaptations of my invention, Figure 1 is a fragmentary side elevation of a double-truck car to which my improvements in their preferred form are applied. Fig. 2 is a fragmentary horizontal section thereof cut on the line 2 2 in Fig. 1 and looking in the direction of the arrow. Fig. 3 is a perspective view of a fragment of a single-truck car equipped with a simple form of my improvements. Fig. 4 is a fragmentary diagrammatic view, on a small scale, illustrating a modification; and Fig. 5 is a similar view of another modification.

Referring to the accompanying drawings, I will first describe the preferred embodiment of my invention in the form shown in Figs. 1 and 2, in which figures let A represent a car or other vehicle; B, the running-gear thereof; C, the body thereof; D, a fender therefor, and E a track on which the car runs.

The car A may be any suitable carriage or vehicle comprising a running-gear and a body carried thereby. The car shown is taken as an example of a multiple or double truck car, in which the body is movable vertically relatively to the running-gear and the gear and body are connected together on a vertical axis, so that one can swing horizontally or laterally relatively to the other. The vertical relative movement of the body and gear is permitted by a yielding supporting connection between these parts and the relative lateral movement by a swivel connection.

The running-gear shown comprises wheels H on the track E, having axles $f$, carried in boxes $g$, connected to trucks F in the construction shown by immovable connections between the boxes and the side frames G of the truck. The side frames shown have forwardly-projecting ends at the front of the wheels and are divided to form top and bottom bars at the center of the truck, which bars are constructed with vertical sockets $h$, movably receiving vertical posts $i$, carrying collars $j$, resting on springs $k$ within the truck-frame, which posts at their upper ends support a transverse chair $a$, on which the body C is carried. To support it from the truck, the body carries at its under side a bearing-block $b$, resting movably on the chair $a$, and to prevent relative displacement of the parts a king-bolt $d$ is provided, around the axis $c$ of which the parts can execute a limited swinging movement sufficient to enable the trucks to accommodate themselves to a curved track. The outer ends of the side frames G are connected by a transverse bar I, that shown being a channel-bar, to which the side frames are riveted to complete the truck. The wheels, and in this construction the truck or its frame, maintain a substantially fixed position vertically relatively to the track, while the body rises and falls under change of load or other conditions on the yielding connection between it and the running-gear. The construction of truck and running-gear shown is taken, as an example, of a well-known form, for which any suitable or known construction may be substituted.

The fender D may be any character of guard for the car designed to prevent persons or obstacles from passing beneath the car-body or against the running-gear. Such fenders are usually, as in the construction shown, carried by some part of the car, that shown being carried by the front end of the body, and are capable of either vertical movement relatively to the car-body, so that they can be moved toward the track as the body rises, or of a swinging or lateral movement relatively to the body, so that they can swing laterally to preserve them over the track at curves in the latter, or they are capable of both such movements. Various constructions of fenders having either or both of these movements are known, and any suitable construction capable of either or both may be used in carrying out my invention. The fender shown is taken as an example of a suitable construction having both the said movements, the vertical movement being provided for by pivoting the fender on a substantially horizontal axis or shaft N, so that it can move or swing vertically, and the lateral movement being provided for by swiveling the fender or its support J to the car-body by the pin $m$.

According to one feature of my invention I provide means operated by the independent movement of the body C relatively to the gear B and governing the vertical position of the fender D automatically. These means may be of any suitable or convenient construction; but I prefer to employ a flexible or yielding connection P between the fender or some part carrying or controlling it, the running-gear or some part thereof having a substantially uniform vertical position relatively to the track, and the body or some part of the car participating to some extent in the independent movements of the latter. In the construction shown in Figs. 1 and 2 the fender-support J consists of a cross-piece $l$, connected to the car and having a suitable number of downwardly-projecting posts $n$, carrying the shaft N, on the axis of which the fender moves, and a fender-carrier K, movable relatively to the support J and connected thereto by being swiveled on the shaft N and coupled to the fender, and in this construction the connection P consists of a rearwardly-projecting arm or part V, connected to the fender by being carried by the carrier K, coupled thereto, a coupling X, connected to said arm, a link W, connected to said coupler near one end and pivoted to the running-gear at its other end, and a link Y, connected to the link W intermediate of its ends and pivotally connected to the body C. These members, when so proportioned or adjusted that the front of the fender occupies a proper position to the track when the body of the car is in the normal position, will serve, as the body moves vertically, to reverse this motion at the front of the fender, and if properly disposed will so increase or diminish the motion that the movement imparted to the front of the fender will preserve the latter in substantially a stationary position vertically relatively to the track. This movement results from the fact that the link Y as it moves with the body swings the forward end of the link W to a predetermined extent in proportion to its own movement, and the movement of the link W is transmitted through the coupling X to the rear end of the arm V, thus tilting the carrier K on its pivotal connection, so that the front end of the fender carried thereby is swung in opposite direction to the movement of the body, thus moving the fender toward the track as the body C moves away therefrom and moving the fender from the track as the body C moves toward the latter and compensating at the fender for all the vertical movements of the body simultaneously with such movements, and automatically. To facilitate adjustment of the various parts of the connection P, the arm V, coupling X, link W, and link Y are adjustably connected together, and the latter link is adjustably connected to the car-body in the construction shown by mounting it on a rod $p$, having screw-threaded ends movably seated in the downwardly-projecting legs of a chair $q$ and adjustable axially by nuts screwed on its ends.

Another feature of the invention provides means for swinging the fender laterally as the car traverses a curve, which means are automatically operated by the relative movement between the car-body and the running-gear, and consist of a connection between the fender, the car-body, or some equivalent movable part, and the running-gear or some part substantially stationary relatively thereto. Various expedients for accomplishing this purpose may be utilized, but I prefer to employ the connection Q, as shown in the drawings, wherein the fender, preferably through its support J, is connected with a chain or equivalent device Z by means of an eye $r$, which chain runs over a sheave $s$, carried by a bracket fastened to the under side of the car, and at its inner end is connected to an eye $t$, carried on the cross-beam I of the truck, at or near the corner of the latter, and is so proportioned and adjusted that as the body C swings away from the corner of the truck to which the eye $t$ is connected the chain Z will be drawn over the sheave $s$, thereby pulling the end of the support J, to which it is attached, inwardly, thus tilting the support and the fender connected to it, so that the outer end of the fender is moved in a direction opposite to the movement of the body relatively to the running-gear. The connection of the chain to the fender or its support is preferably made at such a distance from the pivotal axis of the support that the movement of the chain when the body swings outwardly relatively to the truck will be sufficiently increased or diminished when it is transmitted to the front end of the fender to bring the latter well over the track from which the body is swung.

I prefer to employ a connection P at each side of the car and to duplicate the connections Q in like manner, so that one shall operate when the body swings in one direction and the other when the reverse is the case, but any other number may be employed, if desired.

When the connection P is used with a multiple-truck car and the connection Q is employed to give lateral swing to the fender, it is desirable that the connection P be constructed to permit the lateral movement of the fender without material resistance. Therefore I prefer to construct this connection as a laterally-yielding one, which is accomplished in the construction shown by jointing or pivoting the arm V relatively to the carrier K on a vertical axis, as at $u$, by making the coupling X a swivel-coupling, as by inserting a screw-shank $v$ between its ends, by jointing the link W on a vertical axis, as at $w$, and by adapting the link Y for a horizontal swing, as by making the bar $p$ rotative on its axis in the chair $q$. Any other means for attaining this flexibility may, however, be employed, if desired.

Another feature of the invention provides a fender which can automatically move downwardly to prevent its passage over a person or movable obstacle and which can also, preferably, move upwardly and above its normal position to permit its passage over an immovable obstacle. This I prefer to accomplish in the manner shown, wherein the fender D is constructed of two parts, one an inner, upper, or rear fender L and the other an outer, lower, or advance fender M, the latter movable relatively to the former preferably to several positions. The inner fender L constitutes a rear body and the advance fender M an outer guard. The former is designed to maintain a substantially uniform distance above the track E at such point that it will not contact with any immovable obstruction, and the latter is designed to partly fill or cover the vertical space between the rear body and the track normally and when the fender strikes an object to almost completely fill this space by moving downwardly toward the track, and should the object be immovable to permit the passage of the fender over it by moving upwardly beyond its normal position until it will be above any immovable object over which the car would attempt to run. Various constructions for mounting the advance fender or guard for connecting it to the car-body in such manner that it shall have these several movements, may be employed, but I prefer to connect it to the car, as shown in Fig. 1, through the medium of swinging links T, pivoted at their inner sides to the side frames O of the fender-body L and at their lower ends to the outer sides of forwardly-projecting bars R, constituting the side frames of the advance fender or guard, which bars R are within the width of the side frames O. The links T can swing on their pivotal connections through an arc of approximately one hundred and twenty degrees, and when in the normal position are swung forwardly considerably beyond the vertical, thus carrying the advance guard outwardly and upwardly toward the car-body and the side frames O, as shown in Fig. 1. When swung rearwardly, they carry the frames R and the outer fender downwardly until the vertical position of the links is reached, and their further rearward movement carries these parts upwardly until the bars R are close against the under side of the rear fender L or are housed within the side frames thereof, as desired. The normal position holds the advance fender at the proper point for striking an obstacle, and it is automatically moved to the other positions by the resistance of the obstacle struck, which resistance arrests the progress of the advance fender as the car moves forward, thereby causing the advance fender to move down by swinging the links to the vertical position, which substantially closes the space between the rear fender and the track and prevents the passage of a body beneath the fender, and then if the resistance is continued or the obstacle encountered is immovable the continued arrest of the advance fender causes the links to move to the rear and lift the advance fender until the latter has risen high enough to pass over the body encountered, when it may be restored to the former position. In this manner any movable object will be picked up by the fender and any immovable object will be first engaged and then passed by the fender.

Any suitable means for holding the advance fender in its positions or for restoring it to the initial position may be used, but I prefer to use one or more springs S between the advance fender and the part carrying it for automatically moving the fender to its forward position and holding it there. In the construction shown the frames O have downwardly-turned ears $x$, engaging the front ends of the springs S, and the rear ends of these springs engage the frame R of the outer fender through a cross-rod $y$. Preferably a duplicate set of links T is applied at the inner ends of the frame-bars R to cause a parallel movement between the frames of the two parts of the fender D.

The outer fender M in the construction shown consists of a tilting apron U, pivoted at its front end on a cross-rod $z$, constituting the front bar of the fender, freely movable at its rear end and there supported on the body L of the rear fender. The apron U preferably consists of a wire web carried by two side rods $a'$, which at their inner ends rest on grooved portions $b'$ of the side frames O and there have hooks $c'$ engaging the inner faces of these ends and thus limiting the outward movement of the outer guard M. As the outer guard moves rearwardly the apron rides up and back over the body L. To adjust the front edge of the front guard, its outer end is carried in a bracket $d'$, adjustably connected to the frame R, as by being pivoted thereto at $e'$, and adjustably clamped thereto by a screw $f'$, traversing a slot in the bracket and clamping it to the frame.

The rear fender or body L preferably has a flexible outer edge which is best provided for by constructing its frame as an open-front frame and continuing the wire web $g$ thereof to the front of the body to constitute its front edge. For this purpose the side frames O are terminated with the eyes $x$ at front and are connected together by cross-rods $h'$, intermediate of their ends, on which rods the upper ends of the links are preferably swiveled.

My invention provides an improved separable coupling for attaching fenders to cars, which coupling consists of two parts, the one carried by the fender-support and the other by the fender, the one consisting of suitable projections or carrying-faces and the other of reciprocal sockets or bearing-faces embracing and engaging said projections or carrying-faces and when in one position locking the two parts together and when moved therefrom permitting the free separation of the parts. In the preferred construction of this coupling (shown in Fig. 1) the coupling is lettered $A'$ and consists of a male part $B'$, carried by the fender-support, and a female part $C'$, carried by the fender. The part $B'$ preferably consists of two suitably-separated cylindrical projections, the one above the other, the upper one $i'$ having an outer enlargement or head and preferably consisting of a pin projecting from the side of the carrier K and the lower one $j'$ having a cylindrical body and consisting of the projecting end of the pivotal shaft N, which extends beyond the carrier K for this purpose. In this construction the female member $C'$ consists of a wide flat end on the side frame O of the fender, constituting an upward continuation thereof, having a downwardly-opening socket $k'$ passing over the projection $j'$ of the other member and a downwardly-projecting socket $l'$ above and passing over the projection $i'$ of the other member. The socket $k'$ opens at rear of the plate and the socket $l'$ opens at front thereof, and the sockets and plate are so disposed that the plate will fall until its sockets are thoroughly seated on the projections, where it will be rigidly held during use, and when lifted the plate will rise until its sockets are free from the projections, whereupon the upper end of the plate can be tilted rearwardly and the lower end brought forwardly until the body of the plate can be drawn out between the projections. Preferably two such couplings $A'$ are provided, one at the upper end of each side frame O of the fender, and each embraces the outer face of the adjacent carrier K.

It will be seen that my invention provides improvements in fenders for cars which can be variously and advantageously availed of, increasing the effectiveness of the fender, enabling its use with various classes of cars, and diminishing the liability to injury or breakage in use, and it will be understood that the invention is not limited in its adaptation to the particular features or details of construction or operation or the particular combination of features of improvement set forth as constituting the preferred form of the invention, since it may be availed of in whole or in part, according to such modification of the construction, combination, or arrangement of any or all of the features of improvement as circumstances or the judgment of those skilled in the art may dictate without departing from the spirit of the invention.

One modification of the invention is shown in Fig. 3, which view illustrates a single truck-car, in which the body (lettered $C''$) is movable vertically but immovable laterally relatively to the running-gear $B''$, the support $J''$ is immovable relatively to the body, the fender $D''$ has a stiff front bar $O''$, on which the apron U" rests, and the connection P" consists of an arm V", constituting part of the carrier K", a coupling X", link W", and link Y", connected to the body at a fixed point. In this construction the truck F" supports the body on springs $k''$.

Another modification is shown diagrammatically in Fig. 4, in which a simple fender $D^3$ is pivoted on a support $J^3$ and formed with an integral rearwardly-projecting arm $V^3$, constituting part of the connection $P^3$ between the fender, car-body, and running-gear $B^3$, the remainder of the connection consisting of a chain or equivalent flexible member $W^3$, passing over a sheave $X^3$ on the body, connected at one end to the axle $f^3$ of one of the wheels of the running-gear and at its other end to the arm $V^3$, the truck $F^3$ being in this instance movable vertically relatively to the axle and the body being fixed relatively to the truck. As the truck and body swing the chain $W^3$ will be tightened or slackened, thereby raising or lowering the arm $V^3$ and correspondingly moving in opposite direction the outer end of the fender $D^3$, carrying this arm. For this purpose the arm $V^3$ is weighted, as with a weight $Y^3$, to cause it to swing down when the chain is slackened.

Fig. 5 shows a modification in which only that part of the invention relating to the shifting of the fender when an obstacle is struck is employed. In this view the body is lettered $C^4$ and carries a fixed support $J^4$, from which the fender $D^4$ is movably suspended by links $T^4$, which swing first downwardly and then upwardly as the fender is arrested, thus throwing the latter first toward the track and then raising it upwardly therefrom as the car moves over the fender. A spring $S^4$ holds the fender in the normal position and restores it thereto as before, and a stop $c^4$ determines its normal position.

A catch, as $m'$, Fig. 1, is preferably provided for locking the fender against accidental detachment. The rear side of the fender is best constructed with an open space, as $n'$, Figs. 1 and 2, and $n''$, Fig. 3, so that when the fender is folded up against the end of the car there will be free access through this space beneath the car. Such folding can be done by raising the fender until its coupling is free from the stud $i'$, then tilting it upward and allowing it to be carried on the end $j'$ of the shaft N. One fender can be be used for both ends of the car when supports are provided at each end by uncoupling the fender from one end and applying it to the other end.

The yielding of the connection P is increased by making a sliding engagement between the coupling X and one of the parts it engages, as by constructing it with a shoe $v'$, sliding on the end of the link W, Fig. 1.

What I claim is—

1. In car-fenders and the like, a car comprising a running-gear and a body portion carried thereby and movable relatively thereto, and a fender carried by and movable relatively to said car, in combination with a connection between said running-gear, body and fender, operated by the movement of the body relatively to the running-gear, and when thus operated moving said fender vertically opposite to the vertical movement of said body relatively to said running-gear, said connection comprising a vertically-swinging lever fulcrumed to the running-gear, and connected to the fender to move it, a coupling between said lever and fender yielding to longitudinal movements of the lever as it swings and transmitting only its vertical movements to the fender, and a connection between said lever and said body moving the lever as the body moves.

2. In fenders for cars, a car comprising a running-gear and a body carried thereby and movable vertically relatively thereto, and a fender carried by and movable relatively to said car, in combination with a connection between said running-gear, body and fender, moving the latter vertically relatively to the car, and operated by the vertical movement of said body relatively to said running-gear, and when so operated moving said fender upwardly as said body moves downwardly, comprising a vertically-swinging lever fulcrumed to the running-gear, a connection between said lever and said body moving the lever as the body moves, and a sliding connection between said lever and said fender, transmitting the vertical movements of the lever to the fender, and permitting longitudinal movement of the lever independently of the fender.

3. In fenders for cars, a car comprising a running-gear and a body carried thereby and movable vertically relatively thereto, and a fender carried by and movable relatively to said car, in combination with a connection between said running-gear, body and fender, moving the latter vertically relatively to the car, and operated by the vertical movement of said body relatively to said running-gear, and when so operated moving said fender downwardly as said body moves upwardly, comprising a vertically-swinging lever fulcrumed to the running-gear, a connection between said lever and the car-body moving the lever with the latter, and an adjustable connection between said lever and fender, transmitting the vertical movements of the former to the latter.

4. In fenders for cars, a car comprising a running-gear and a relatively-movable body, in combination with a fender-support carried by said body, a fender-carrier pivoted thereto movable on its pivotal connection therewith and having a projecting arm, a fender carried by and movable with said carrier, a separable connection between said carrier and fender, a connection between said carrier, running-gear and body, consisting of a vertically-swinging lever fulcrumed to the gear, a link between said lever and the body swinging the lever with the body, and a flexible connection between the lever and said arm moving the latter therewith, whereby the motion of said body relatively to said gear is transmitted to said carrier and fender, and the latter can be detached, substantially as and for the purpose set forth.

5. In fenders for cars, a car comprising a running-gear and a body carried thereby and movable laterally relatively thereto, in combination with a fender carried by said car and movable laterally relatively thereto, and a flexible connection between said fender, body and running-gear movably connected to each, and moving said fender laterally, operated by the relative lateral movement of said body and gear, and when thus operated moving said fender relatively to said body in a direction substantially the reverse of the direction of movement of the latter relatively to said gear.

6. In fenders for cars, a car comprising a running-gear and body carried thereby and movable laterally relatively thereto, in combination with a fender-support pivoted to said body on a substantially vertical axis, swinging horizontally, a fender carried thereby projecting at its front end toward the front of said car, and a flexible connection between said fender-support, body and running-gear, moving said support on its pivotal axis when said body moves laterally relatively to said running-gear, said connection comprising a chain flexibly connected to and pulled by said gear.

7. In fenders for cars, a fender having a front guard movable vertically and rearwardly, means normally holding said guard in an upper and forward position and permitting its movement from such position under pressure, and parallel links carrying and moving said guard downwardly and rearwardly when force is applied thereto.

8. In fenders for cars, a fender having a rearward body L and a forward guard M, the latter movable downwardly relatively to the former, a frame R carrying said guard, supported by said body, and brackets $d'$ pivoted to said frame and adjustable to vary the elevation of said guard relatively thereto, and means holding said forward guard normally in an upper position.

9. In fenders for cars, a fender having a rear body and an outer guard, the latter movable rearwardly relatively to said body, a frame beneath and supported by said body, and carrying said guard normally holding the latter in an outward position and permitting its movement toward said body under pressure and a movable connection between said body and frame moving the latter parallel with said body.

10. In fenders for cars, a fender having a body and a front guard, a body-frame and a guard-frame supported thereby movable longitudinally thereof, substantially parallel therewith and carrying said guard, a movable connection between said body and guard frames and a spring S, carried by said body-frame, reacting against said guard-frame, and thereby normally holding said guard in advance of said body.

11. In fenders for cars, a fender having a body and side frames, and a front guard having side frames movable relatively to said body, and connecting-links between the side frames of said parts carrying said guard from said body, and permitting the rearward and downward swinging of the guard relatively to the body.

12. In fenders for cars, a fender comprising a body having side frames, and a fender-support adapted to be carried by a car and to carry such fender, in combination with a separable coupling between said fender and support, consisting of two members, the one carried by the support and the other carried by the fender, the one having bearing-faces or projections spaced apart and the other having recesses having carrying-faces embracing said bearing-faces, and a body in which said recesses are formed traversing the space between said projections when said faces are in engagement, and removable through the space between said faces while said members are being separated.

13. In fenders for cars, a fender having a rear portion L having side frames, and an outer portion M having side frames, a movable connection between said portions, a web covering said rear portion, and an apron covering said outer portion in advance of and below said web, said outer portion and its frames movable bodily forwardly and rearwardly independently of said rear portion.

14. In fenders for cars, a fender-support consisting of a cross-piece adapted to be swiveled on a vertical axis to a car-body, and having downwardly-projecting posts, a forwardly-projecting fender carried by said posts, a pivotal connection on a horizontal axis between said fender and posts, means swinging said support on its vertical axis, and means swinging said fender on its horizontal axis.

15. In fenders for cars, a car comprising a running-gear and a body carried thereby and movable vertically relatively thereto, and a fender carried by and movable relatively to said car, in combination with a connection between said running-gear, body and fender, moving the latter vertically relatively to the car, and operated by the vertical movement of said body relatively to said running-gear, and when so operated moving said fender upwardly as said body moves downwardly, comprising a vertically-swinging lever fulcrumed to the running-gear, and connected to the fender, and a link connected to said lever and the car-body, moving the former as the latter moves, and adjustable to vary the movement of said lever.

16. In fenders for cars, a car comprising a running-gear and a body carried thereby and movable vertically relatively thereto, and a fender carried by and movable vertically relatively to said car, in combination with a connection between said running-gear, body and fender, moving the latter in opposition to the vertical movement of the body and operated by such movement, comprising a vertically-swinging lever fulcrumed to the running-gear and connected to the fender, and a link connected to said lever and said body for moving the former as the latter moves, said link adjustably connected to said body, whereby its action on said lever can be adjusted.

17. In fenders for cars, a car comprising a running-gear and a body carried by and movable vertically of the latter, and a fender carried by and movable vertically of the car, in combination with a connection between said parts moving the fender vertically in opposition to, and operated by, the vertical movement of said body relative to said gear, comprising a vertically-swinging lever fulcrumed to the running-gear, and connected to the fender for moving it, and a link connected to the body and said lever for moving the latter from the former, and an adjustable connection between said link and lever, whereby the movement of the latter can be adjusted.

18. In fenders for cars, a car comprising a running-gear and a body carried thereby and vertically movable relatively thereto, in combination with a fender pivotally connected to said body on an axis fixed relatively thereto, a rearwardly-projecting arm rigidly connected to said fender, swinging vertically therewith in opposite direction thereto on said axis and moving said fender, and a flexible connection between the running-gear, car-body, and said arm, moved by the vertical movements of the body relatively to the gear and raising the rear end of said arm when the body rises and lowering it when said body lowers, said connection yielding to permit the swinging of said arm on said axis and transmitting only vertical movements to the arm.

19. In fenders for cars, a car comprising a running-gear and a body carried and movable vertically thereon, and a fender pivotally connected to said body, in combination with a vertically-swinging arm connected to and moving said fender, swinging on the pivotal connection between the latter and the body at rear of such connection, a lever fulcrumed to the running-gear, projecting toward said arm and swinging vertically at its outer end, a connection between said lever and body moving the lever as the body moves, and a yielding connection between the ends of said arm and lever moving the former vertically with the latter, and permitting independent longitudinal movement of the arm and lever.

20. In fenders for cars, a car comprising a running-gear and a body carried and movable vertically thereon, and a fender pivotally carried by said body and swinging vertically at front thereof, in combination with an arm swinging on the pivotal connection between said fender and body, projecting at rear of said connection and moving the fender, a lever fulcrumed to the running-gear, swinging vertically, and projecting at its outer end toward said arm, a connection between said lever and body moving the former with the vertical movement of the latter, and a coupling between the ends of said arm and lever, movably connected to each and transmitting the vertical movements of one to the other and yielding to their longitudinal movement.

21. In fenders for cars, a car comprising a running-gear and a body carried and vertically movable thereon, and a fender carried by said body, swinging vertically at its forward end in front thereof, in combination with a rearwardly-projecting arm swinging vertically and connected to said fender and swinging it, a lever fulcrumed to the running-gear, projecting at its forward end adjacent to said arm and swinging vertically, a connection between said lever and body moving the former with the latter, and an adjustable coupling between and movably connecting the swinging ends of said arm and lever and transmitting the vertical movements of the latter to the former.

In witness whereof I have hereunto signed my name in the presence of two subscribing witnesses.

JAMES N. WEIKLY.

Witnesses:
EUGENE V. THOMAS,
HENRY MADES.